United States Patent [19]

Vaslas

[11] 4,128,266

[45] Dec. 5, 1978

[54] AUXILIARY HANDLE FOR LONG-HANDLED IMPLEMENTS

[76] Inventor: John W. Vaslas, 282 Park St., Staten Island, N.Y. 10306

[21] Appl. No.: 842,319

[22] Filed: Oct. 14, 1977

[51] Int. Cl.² .......................... A01B 1/22; B65G 1/06
[52] U.S. Cl. .................................... 294/58; 16/114 R
[58] Field of Search ....................... 294/49, 54, 57-59; 15/143 R, 144 R, 145; 16/114 R, 115; 37/53

[56] References Cited

U.S. PATENT DOCUMENTS

| | | | |
|---|---|---|---|
| 875,504 | 12/1907 | Clark | 294/58 |
| 933,647 | 9/1909 | Hunt | 294/58 |
| 1,449,702 | 3/1923 | Sizemore | 294/59 |
| 2,416,414 | 2/1947 | Spencer | 294/58 |
| 3,751,094 | 8/1973 | Bohler | 294/58 |

*Primary Examiner*—Johnny D. Cherry
*Attorney, Agent, or Firm*—Norbert P. Holler

[57] ABSTRACT

An auxiliary handle for long-handled implements such as shovels, rakes, mops, brooms, snow shovels, and the like and enabling the user to obtain extra leverage without excessively straining himself, is disclosed. The auxiliary handle includes a triangular frame having a pair of rods constituting the legs of the triangle and diverging from closely juxtaposed first ends to relatively widely spaced second ends, and a transverse member pivotally connected to the rods at their second ends to constitute the base of the triangle and having medial members for releasably clamping it to the main handle of such an implement. A hand grip is fixedly secured to the auxiliary handle rods at the apex of the triangular frame, and a rigid cross-brace bar, which may be medially foldable, is swively connected at one of its ends to the apex of the frame and is pivotally connected at its other end with members for releasably locking it to the main handle of the implement. The auxiliary handle can be easily adjusted to different positions along the implement handle, and the angular inclination of the triangular frame relative to the implement handle can be varied as desired by the user. This abstract is not to be taken either as a complete exposition or as a limitation of the present invention, however, the full nature and extent of the invention being discernible only by reference to and from the entire disclosure.

6 Claims, 9 Drawing Figures

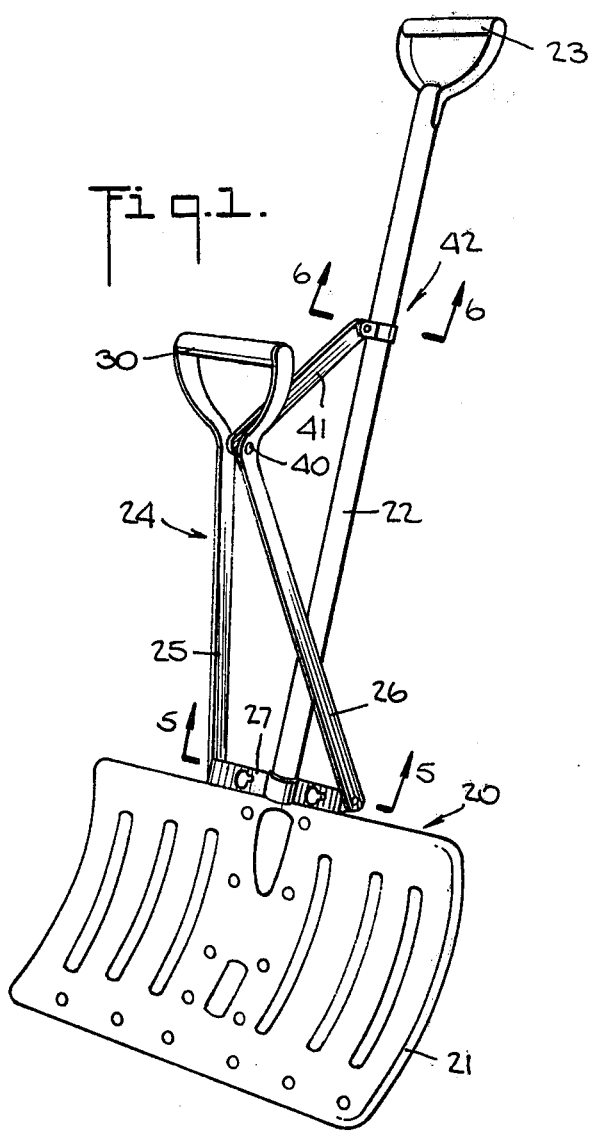
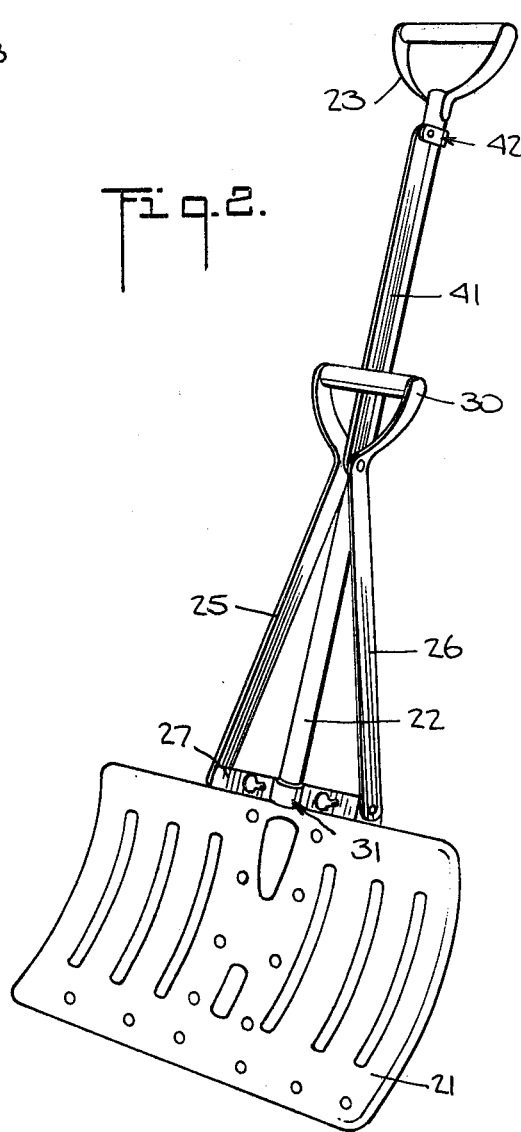
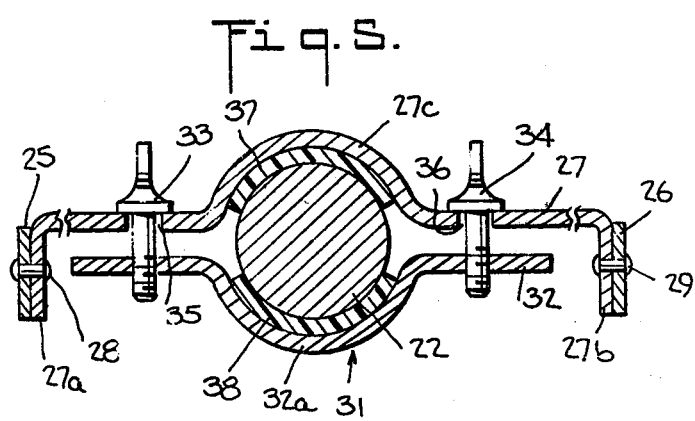

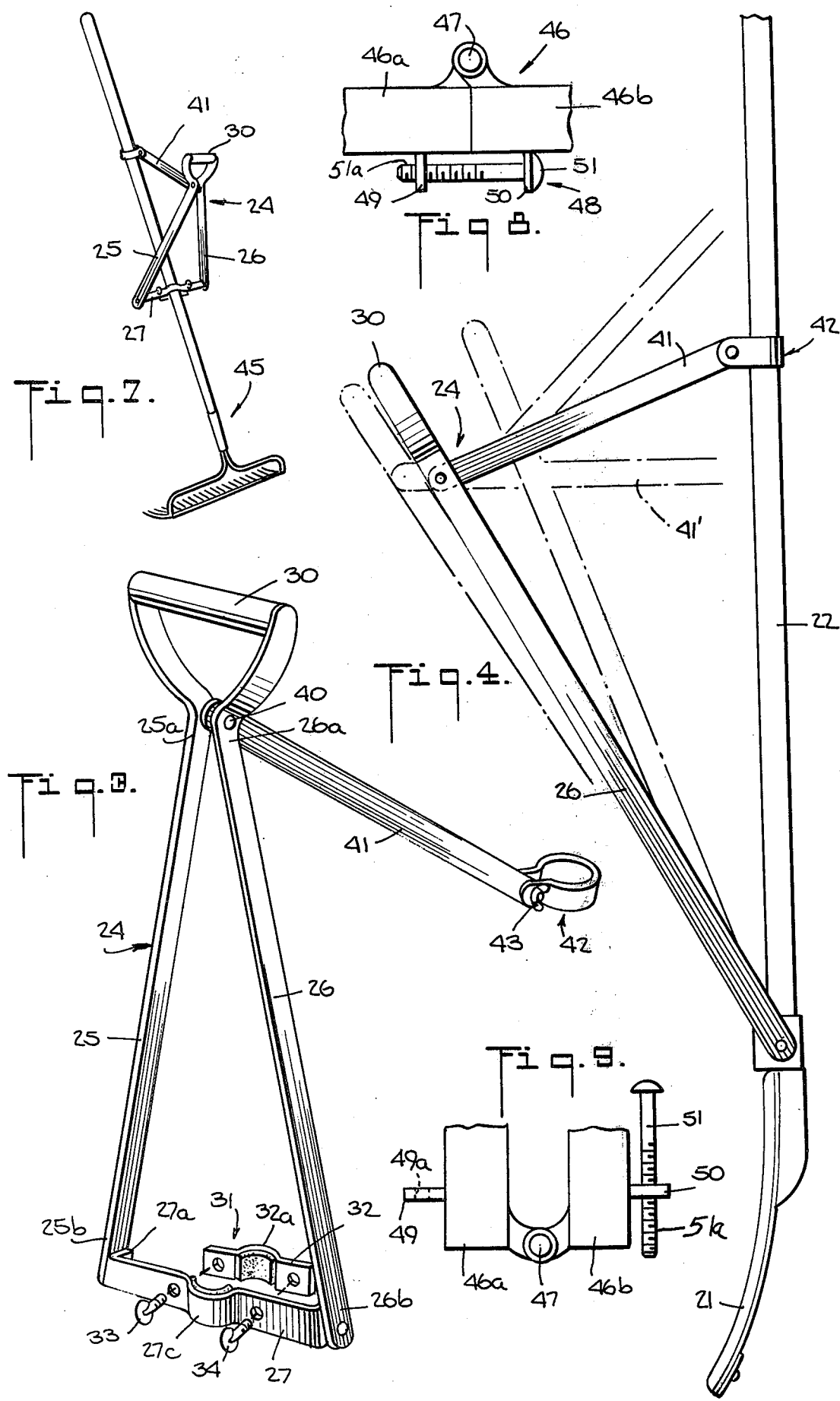

AUXILIARY HANDLE FOR LONG-HANDLED IMPLEMENTS

This invention relates to auxiliary handles for long-handled implements such as shovels, rakes, mops, snow shovels, and the like, and more particularly to a modified auxiliary handle structure which will enable a person to use such an implement without having to bend over and thus without having to exert undue strains on his back.

Although, as will be apparent, the present invention is of relatively wide utility in terms of the types of implements with which an auxiliary handle embodying the principles of the invention can be used, the invention will be described herein with the principal focus on its applicability to use with snow shovels.

Conventional snow shovels which are presently on the market are all, insofar as the applicant is aware, composed of a ground-engaging blade or scoop and a handle rod rigidly affixed thereto. The user of such a shovel normally first pushes it along the ground while walking in an upright position and holding the shovel by the usual handle grip affixed to the upper end of the handle rod, to break up and dislodge a quantity of snow. When the shovel is full, the user shifts his position to one side of the shovel and bends over, grasping the handle rod with one hand at the hand grip and with the other hand at a location fairly close to the scoop in order to obtain sufficient leverage. By pulling the lower section of the handle rod upwardly, the user then raises the scoop and can toss the mass of snow thereon to one side or the other.

As anyone who has ever shoveled snow will readily attest, this activity can be extremely fatiguing, and it moreover requires the exertion of considerable strains on the user's back when he has raised the snow-laden scoop off the ground and is straightening his back during the action of tossing the snow off to one side. While such strains may not be excessive for people who are in good physical shape and have a strong back, they constitute an intolerable condition to a person who has a weak back or is not physically in good shape.

In this connection, the provision of auxiliary handles for conventional snow shovels for the specific purpose of minimizing the back strain problems has previously been suggested. For example, modified snow shovels equipped with auxiliary handle constructions of one type or another are disclosed in Bickley U.S. Pat. No. 2,521,441, Steeb U.S. Pat. No. 3,082,554 and Bohler U.S. Pat. No. 3,751,094. The basic concept of providing an auxiliary handle construction on various types of general purpose shovels and similar materialhandling devices was, of course, not new even at the time of the first of the above-mentioned patents. It is shown, for example, by Beale U.S. Pat. No. 62,594 and Gardner U.S. Pat. No. 161,678 (both already more than a century old) for pitchforks, and by Williams U.S. Pat. No. 725,905, Clark U.S. Pat. No. 875,504, Sizemore U.S. Pat. No. 1,449,702 and Spencer U.S. Pat. No. 2,416,414 (all between 30 and 75 years old) for shovels. Nevertheless, as far as applicant is aware, no such modified snow shovels, nor even auxiliary handles capable of being attached to snow shovels (or other long-handled implements), are currently commercially available, presumably either because manufacturing difficulties have been encountered or because the respective constructions have not in practice proved to be as efficacious in the attainment of their stated purposes as they seemed to be on paper.

It is an object of the present invention, therefore, to provide an improved and novel auxiliary handle for a snow shovel or other long-handled implement, which auxiliary handle can be readily and adjustably attached to the main handle of any such implement as to enable the same to be easily manipulated by the user without his having to bend over or unduly strain his back in the use of the implement.

It is also an object of the present invention to provide an auxiliary handle for long-handled implements as aforesaid, which is easy and economical to manufacture.

It is another object of the present invention to provide an auxiliary handle for long-handled implements as aforesaid which is characterized by a construction of the auxiliary handle such that the same, though it is capable of adjustment relative to the main handle of the implement and thus is adaptable for use by persons of different sizes and strengths, is nevertheless, when in use, rigidly interconnected with the main handle.

Generally speaking, the attainment of the aforesaid objectives of the present invention involves the provision, for a generally conventional snow shovel or other long-handled implement, of an auxiliary handle having the form of a triangular, preferably isosceles triangular, frame, the base member of which can be clamped to the implement handle and is pivotally connected with the leg members, and the leg members of which are connected at their apex ends to both a hand grip and a pivotally displaceable brace member which can also be clamped to the implement handle so as to fix the angular orientation of the auxiliary handle to the implement handle.

More particularly, the frame portion of the auxiliary handle is constituted by a pair of rods, constituting the leg members of the triangle, which have closely juxtaposed first ends and diverge from one another in the direction of relatively widely spaced second ends. A transverse member, which constitutes the base member of the triangle and is provided with means enabling it to be releasably clamped to an implement handle, extends between and is pivotally connected at its opposite ends to the auxiliary handle rods at their second ends. A hand grip is fixedly connected to the auxiliary rods at juncture between their first ends, constituting the apex of the triangle. Also connected to the frame at the apex thereof is a rigid cross-brace bar which is swivelly connected at one end to the auxiliary handle rods at the juncture of said first ends thereof with the hand grip and has means at its other end enabling it to be releasably clamped to the implement handle. In the currently preferred form of the auxiliary handle according to the present invention, the clamping means for the base member of the frame is defined by a recessed seat portion formed in the transverse member and a cooperating releasable cover strap between which the implement handle rod can be confined and gripped, while the clamping means for the brace bar is a pipe clamp-type of strap adapted to encircle the implement handle rod.

By virtue of the construction of the auxiliary handle in the manner described, the base member of the frame can be adjusted on and clamped to the implement handle in any desired selected position closely adjacent to or spaced from the operating member of the implement, e.g. the scoop of a snow shovel, and the brace bar can likewise be adjusted on and clamped to the implement handle in any desired selected position between that of the base member clamping means and the free end of the implement handle, with the pivotal connection of the base member to the leg members of the frame thus enabling the frame to assume a corresponding variety of angular orientations or inclinations relative to the implement handle. When the implement is to be stored and compactness is a consideration, one or both of the clamping means can simply be loosened, and the frame and brace bar can be laid essentially flat against the implement handle. Alternatively, the auxiliary handle can be completely removed from the implement handle altogether, in which case the brace bar will usually lie between the leg members (essentially in the manner of an altitude of the triangle).

The foregoing and other objects, characteristics and advantages of the present invention will be more clearly understood from the following detailed description thereof when read in conjunction with the accompanying drawings, in which:

FIG. 1 is a perspective illustration of a snow shovel having an auxiliary handle in accordance with the present invention connected thereto in its operating position;

FIG. 2 is a view similar to FIG. 1 but shows the auxiliary handle laid back against the handle of the shovel when the latter is not in use;

FIG. 3 is a perspective view, on an enlarged scale, of the auxiliary handle according to the present invention independent of its attachment to any particular implement;

FIG. 4 is a fragmentary side elevational view, also drawn to an enlarged scale, of the structure shown in FIG. 1 and illustrates the adjustment of the auxiliary handle relative to the main handle of the shovel;

FIGS. 5 and 6 are sectional views taken, respectively, along the lines 5—5 and 6—6 in FIG. 1;

FIG. 7 is a perspective view, on a somewhat smaller scale, of an auxiliary handle according to the present invention as attached to a rake; and FIGS. 8 and 9 are fragmentary elevational views of a modified form of the brace bar in the conditions of use and non-use thereof.

Referring now to the drawings in greater detail, a snow shovel 20 of conventional construction is shown in FIGS. 1, 2 and 4 as including a scoop or blade 21 and a main handle 22 rigidly secured to one end to the scoop 21 and having a hand grip 23 at its other end. Secured to the main handle rod 22 is an auxiliary handle 24, according to the present invention, which will now be described.

The auxiliary handle 24 (see also FIG. 3) includes a pair of rods 25 and 26 which have respective first ends 25a and 26a closely juxtaposed to one another and diverge therefrom in the direction of their second ends 25b and 26b. The latter are thus relatively widely spaced. At their said second ends, the auxiliary handle rods 25 and 26 are interconnected by a transverse bar or member 27 which is pivotally connected at its opposite angle ends 27a and 27b to the rods 25 and 26 by respective pivot pins 28 and 29. A hand grip 30 is affixed to the auxiliary handle rods at their first ends 25a and 26a.

The auxiliary handle elements 25, 26 and 27 thus form a triangular frame, with the rods 25 and 26 constituting the leg members and the transverse member 27 constituting the base member of the triangle. The lengths of the rods 25 and 26 found suitable for different implements may, if desired, be varied as dictated by considerations of the amount of leverage that may be required in the intended areas of use of the implements (for example, a snow shovel may require rods longer than, say, a mop or broom), but given this parameter, the rods 25 and 26 ordinarily will be equal in length. It will be apparent, of course, that they may be either longer or shorter than the transverse member 27, thereby providing an isosceles triangular frame, or all three elements may be of equal length, thereby providing an equilateral triangular frame.

The frame 25-26-27 is further provided with means associated with the member 27 for releasably clamping the latter and thus the frame itself to the handle 22 of the shovel or other implement. In the illustrated form of the invention, the clamping structure 31 includes (see also FIG. 5) a recessed or seat portion 27c in the member 27 and juxtaposed thereto a correspondingly recessed portion 32a of a cover or strap element 32 secured to the member 27 by suitable fastening elements, e.g. a pair of screw bolts 33 and 34 extending through respective apertures 35 and 36 in the member 27 and threaded into the strap element 32. Although not essential, the recessed portions 27c and 32a are preferably lined with layers 37 and 38 of rubber or a suitable synthetic plastic material to enhance the frictional gripping of the handle rod 22.

Pivotally or swivelly connected, as by means of a pin 40, with the auxiliary handle rods 25 and 26 at the juncture thereof with the hand grip 30, i.e. at the apex of the triangular frame, is one end of a cross-brace bar 41. At its other end, the cross-brace bar 41 is pivotally connected to a hose or pipe clamp-type element 42 which includes a circular strap portion 42a dimensioned to encircle the implement handle 22 and terminate in a pair of straight end portions 42b and 42c, the latter being provided with corresponding aligned apertures therein to accommodate the shank 43a of a headed screw or bolt 43. The pivotal connection of the clamp strap 42 to the cross-brace bar 41 is effected by the screw shank also passing through an aperture suitably provided in the end of the brace bar 41. Drawing the end portions 42b and 42c closer together or permitting them to separate somewhat under the normal expansion force of the strap 42a is effected with the aid of a nut 44.

As will be readily apparent from FIG. 3, when the handle 24 is not attached to any implement, it will normally have the brace bar 41 hanging down between the rods 25 and 26 from the apex of the triangular frame, with the strap 32 of the clamping means 31 for the frame secured more or less tightly to the transverse member 27, and with the clamping means 42 for the brace bar suspended therefrom by means of the bolt and nut combination 43-44.

Assuming now that the auxiliary handle is to be attached to the snow shovel 20, the clamping means 31 and 42 are first opened completely. Once the strap 32 has been separated from the member 27, the recessed portions 27c and 32a are fitted against the handle 22 at the desired location along the length of the handle, and the screws 33 and 34 are then threaded into the strap 32 to draw the latter tight against the handle. As shown in FIG. 1, in the case of a snow shovel it is preferred that the member 27 be as far down along the handle 22 as feasible, i.e. up against the top edge of the scoop 21, but this may obviously be varied to suit the individual user's desires. The triangular frame of the auxiliary handle is then tilted away from the main handle 22, the nut 44 is unscrewed and the bolt 43 extracted, the strap 42a is expanded and fitted about the handle 22, the brace bar 41 is swung up about the pin 40 to bring its aperture into alignment with those in the clamp strap end portions 42b 42c, and the screw or bolt 43 is reinserted through the aligned apertures in the strap ends 42b and 42c and the brace bar 41. The nut and bolt are then screwed together to draw the strap 42 tight against the handle 22. This can, of course, be done at any one of a series of elevated positions of the cross-brace bar 41 at or above the lowermost horizontal one shown in phantom outline in FIG. 4 at 41', so as to locate the triangular frame of the auxiliary handle 24 at the desired inclination to the handle 22 and thereby to locate the hand grip 30 at the desired elevation relative to and spacing from the hand grip 23. The selection of any given one of these positions for each user will naturally be governed by the size of the user and by whatever arrangement makes him feel most comfortable and gives him the best leverage.

The manner of use of the shovel 20 will now be readily apparent. After a mass of snow has been accumulated against the front face of the scoop 21, the user assumes a stance to one side of the shovel and grabs the hand grip 30 with one hand and the hand grip 23 with the other. He then pulls up on the auxiliary handle 24 and simultaneously pushes down on the shovel handle 22, and by virtue of the leverage provided by the rigid mechanical triangular system 22-27-25/26-41 is easily able, while standing erect and without bending over, to lift the load of snow and dispose of it to one side or the other of the area being cleared.

On the other hand, when the shovel is to be stored away with the auxiliary handle 24 still attached thereto but taking up a minimum of space, the nut 44 is unscrewed somewhat on the bolt 43 to loosen the clamp strap 42. The latter can then be slid either down or, as shown in FIG. 2, up along the handle 22 and the brace bar 41 laid flat against the handle, which simultaneously causes the triangular frame to be leaned over against the handle 22 and brings the entire combination to as compact a state as possible.

As previously indicated herein, the auxiliary handle according to the present invention is capable of use with other types of long-handled implements than snow shovels. Merely by way of example, it is shown in FIG. 7 as applied to a garden rake 45, but it will be apparent that the implement may be a mop, a broom, etc.

Pursuant to a refinement of the present invention, in the auxiliary handle 24 the rigid cross-brace bar 41, which has been shown as being a unitary structural element, need not be such but may, as shown in FIGS. 8 and 9, be a collapsible structure 46 composed of two end to end abuttable sections 46a and 46b articulated to each other by an upwardly projecting hinge connection 47. In order to enable the bar 46 to be rigidified when in use, the sections 46a and 46b thereof are provided, preferably at a location opposite the hinge elements, with cooperable releasable locking means 48. In the illustrated embodiment the locking means includes a pair of correspondingly apertured lugs 49 and 50 rigidly affixed to the respective cross-brace bar sections 46a and 46b, and a headed screw bolt 51. The shank 51a of the bolt is adapted to be extended through those apertures, and the bolt is secured in place by being screwed into the aperture 49a (FIG. 9) which is tapped for that purpose. Alternatively, of course, the locking could be effected by means of a nut (not shown) tightened on the tip end region of the bolt shank 51a against the lug 49. Again alternatively, the locking means could just as well be a latch and pin construction or the like. By virtue of this sectional construction of the cross-brace bar 46, therefore (which is nevertheless contemplated as being encompassed by the term "rigid" as used herein), the same can be easily collapsed from the state shown in FIG. 8 to the state shown in FIG. 9 when the implement is to be taken out of use, which will enable the auxiliary handle to be leaned up against the implement handle without the cross-brace bar first having to be unclamped from the latter.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. An auxiliary handle for use with a long-handled implement having a rod-shaped main handle; said auxiliary handle comprising a triangular frame including a pair of auxiliary handle rods constituting the leg members of the triangle and a transverse member constituting the base member of the triangle, said auxiliary handle rods having respective first and second ends and being closely juxtaposed to one another at said first ends thereof to define the apex of the triangle and being relatively widely spaced from one another at said second ends, said transverse member extending between and being pivotally connected to said auxiliary handle rods at said second ends thereof, a hand grip secured to said auxiliary handle rods at said first ends thereof, a rigid cross-brace bar having first and second ends and pivotally connected at said first end thereof to said frame adjacent the juncture of said auxiliary handle rods with said hand grip, first clamping means coupled with said transverse member for releasably locking the latter to the implement handle, and second clamping means pivotally connected to said cross-brace bar at said second end thereof and adapted to be placed in engagement with the implement handle and releasably locked thereto, whereby said first and second clamping means can be connected with the implement handle in respective selected adjusted positions along the latter for adjusting the angular orientations of said cross-brace bar and said frame relative to one another and the implement handle.

2. An auxiliary handle according to claim 1, wherein said first clamping means includes a first handle rod-receiving seat portion provided on said transverse member, a gripping strap juxtaposed to said transverse member and provided with a second handle rod-receiving seat portion disposed opposite said first seat portion, and means cooperating with said transverse member and said strap for effecting relative approaching and separating displacement between the same for clamping or releasing an implement handle passing between said seat portions.

3. An auxiliary handle according to claim 1, wherein said second clamping means includes a pipe or hose clamp-like strap having a body portion adapted to fit about the implement handle and a pair of end portions juxtaposed to one another, said end portions being pivotally connected to said cross-brace bar, and means cooperating with said end portions for effecting relative approaching or separating displacement therebetween to tighten said body portion against or release it from the implement handle.

4. An auxiliary handle according to claim 3, wherein said first clamping means includes a first handle rod-receiving seat portion provided on said transverse member, a gripping strap juxtaposed to said transverse member and provided with a second handle rod-receiving seat portion disposed opposite said first seat portion, and means cooperating with said transverse member and said strap for effecting relative approaching and separating displacement between the same for clamping or releasing an implement handle passing between said seat portions.

5. An auxiliary handle according to claim 1, wherein the pivotal connection of said cross-brace bar to said frame is such that when said second clamping means is not engaged with an implement handle said cross-brace bar pivots into a position between said auxiliary handle rods.

6. An auxiliary handle according to claim 1, wherein said cross-brace bar includes a pair of bar sections each having a first end and a second end, hinge means articulating said bar sections to one another at said first ends thereof for movement between a position in which said bar sections are longitudinally aligned with one another with said first ends thereof in abutment against each other and a position in which said bar sections are disposed generally alongside one another with said first ends thereof spaced from each other, said second ends of said bar sections constituting said first and said second end, respectively, of said cross-brace bar, and means for releasably locking said bar sections to one another in their aligned position.

* * * * *